United States Patent [19]

Chiu

[11] Patent Number: 4,954,955
[45] Date of Patent: Sep. 4, 1990

[54] MEANS AND METHOD FOR ELECTRONIC CODING OF IDEOGRAPHIC CHARACTERS

[75] Inventor: Andrew Chiu, Scarborough, Canada

[73] Assignee: Brushwriter Corporation PTE Ltd., Scarborough, Canada

[21] Appl. No.: 74,999

[22] Filed: Jul. 14, 1987

[30] Foreign Application Priority Data

Aug. 18, 1986 [CA] Canada .................................. 516180

[51] Int. Cl.⁵ .............................................. B41J 5/10
[52] U.S. Cl. ..................................... 364/419; 400/110
[58] Field of Search ...................... 400/110, 184, 489; 384/419

[56] References Cited

U.S. PATENT DOCUMENTS

| | | | |
|---|---|---|---|
| 3,927,752 | 12/1975 | Jones et al. | 400/487 |
| 4,075,465 | 2/1978 | Funk et al. | 23 S/145 R |
| 4,187,031 | 2/1980 | Yeh | 400/83 |
| 4,270,022 | 5/1981 | Loh | 400/110 X |
| 4,327,421 | 4/1982 | Wang | 400/110 X |
| 4,379,288 | 4/1983 | Leung et al. | 400/110 X |
| 4,381,502 | 4/1983 | Prame | 340/365 R |
| 4,408,199 | 10/1986 | White et al. | 400/110 X |
| 4,484,305 | 11/1984 | Ho | 364/900 |
| 4,500,872 | 2/1985 | Huang | 340/365 R |
| 4,531,119 | 7/1985 | Nakayama et al. | 340/312 |
| 4,544,276 | 10/1985 | Horodeck | 400/110 |
| 4,559,615 | 12/1985 | Goo et al. | 364/900 |
| 4,565,459 | 1/1986 | Dilucia | 400/110 |
| 4,602,878 | 7/1986 | Merner et al. | 400/110 |
| 4,669,901 | 6/1987 | Feng | 400/110 X |
| 4,684,926 | 8/1987 | Yong-Min | 400/110 X |

FOREIGN PATENT DOCUMENTS

0196355 6/1986 European Pat. Off. .

Primary Examiner—Clark A. Jablon
Assistant Examiner—Steven G. Kibby

[57] ABSTRACT

The invention comprises a keyboard and an input apparatus for encoding an incoming ideographic character according to a set of pre-determined basic stroke component. A keyboard has first keys each associated with a basic stroke component and second keys each associated with a selected frequently used radical, each first and second key also being associated with a selected frequently used ideographic character. The keyboard also has a third key associated with a component/radical selection code and a fourth key associated with a character selection code. An interpreter device is responsive to sequential actuation of the keyboard keys to generate a code signal corresponding to the incoming ideographic character. The method according to the invention comprises the steps of associating a basic stroke components with first keys on a conventional keyboard, associating selected frequently used radicals with second keys thereon, associating each first and second key also with a selected frequently used ideographic character, associating a third key with a component radical selection code, associating a fourth key with a character selection code, and interpreting signals from the keyboard to generate a code signal corresponding the incoming ideographic character.

54 Claims, 4 Drawing Sheets

MEANS AND METHOD FOR ELECTRONIC CODING OF IDEOGRAPHIC CHARACTERS

NATURE OF THE INVENTION

The invention relates to a keyboard, input apparatus and method for encoding ideographic characters, and in particular to a keyboard and input apparatus for encoding ideographic characters and to a method of using a conventional keyboard for encoding ideographic characters.

BACKGROUND OF THE INVENTION

Some written languages, such as Chinese, Japanese and Korean, use individual symbols (that is, ideographs, or ideographic characters) to represent individual words or concepts. Such languages do not traditionally possess an alphabet from which words and phrases are constructed. Although a language may have 30,000 or more ideographs, generally fewer are required for everyday use. However, even for everyday use, the number of ideographs with which a person must be familiar is relatively high. For example, in Chinese, a written vocabulary of 10,000 ideographs would generally be sufficient for most uses. Some official vocabularies define about 7,000 ideographs, which would provide reasonable proficiency in written communication.

Such large numbers of different ideographs result in difficulties in written communication. A writer must have a high degree of literacy. He must have most standard ideographs memorized, or be constantly checking an ideographic dictionary. A publisher must have a substantial library of different ideographic characters. Physically, it may be difficult to store a large number of ideographic printing elements. Once in storage, it may also be difficult to relocate a particular printing element for use. Typewriters may have hundreds of keys, resulting in slow, inconvenient typing.

Similarly, in telecommunications or in electronic data processing systems, conventionally each ideographic character is assigned a unique, but arbitrary, code. In order to input text into such a system, an operator must memorize thousands of codes, or be constantly checking codes from a table. The former case requires a highly trained operator. The latter case requires large expenditures of time. In addition, tables, lists or dictionaries of ideographic characters are conventionally arranged according to phonetic rules. Accordingly, even in the latter case, the operator must have some phonetic training in the language in order to be able to locate the proper codes from a phonetically arranged table.

In order to improve the use of ideographic characters, particularly in electronic applications, various methods have been proposed for the systematic encoding of ideographic characters. Some methods are based on pronunciation or phonetic rules. Such methods suffer the disadvantage that there may be pronunciation differences from dialect to dialect and even individual to individual. They also require some phonetic training by the operator; in other words, an operator must have some degree of literacy.

Other encoding methods are based upon the physical structure of the written character. See, for example, U.S. Pat. Nos. 3,665,450; 4,173,753; 4,327,421; 4,379,288; 4,462,703; 4,490,789; and 4,505,602. The specific application of such methods may vary depending on the specific language. However, in general, the principles for such structural encoding methods are similar.

Generally, the ideographic characters of the language are analyzed into their component strokes or sub-structures. Such strokes or sub-structures are compared to a predetermined set of idealized basic elements, or stroke identification indicia. Each basic element may correspond to one or more actual component strokes or sub-structures. Each stroke or sub-structure in the character is identified with one of the idealized basic elements. In other words, the various strokes are divided into a number of distinct groups with each group assigned one of the basic elements, or stroke identification indicia. Accordingly, such basic elements, or indicia, cooperate to allow any ideographic character to be represented by a series of such elements or indicia. For example, U.S. Pat. No. 4,379,288 teaches that Chinese characters may be reasonably encoded by considering only 5 basic stroke elements—a horizontal stroke, a vertical stroke, a dot, two oblique strokes or curves (left and right) and an angular stroke. As shown in various examples therein, different ideographic characters may be encoded, by considering the same 5 basic stroke elements. U.S. Pat. No. 4,379,288 uses a relatively simple scheme for encoding. Others, such as U.S. Pat. No. 3,665,450 or some of the prior art referred to in U.S. Pat. No. 4,379,288, may teach more complex methods.

Such coding systems suffer from the disadvantage that each character or character sub-structure must be analyzed into its code components each time such character or sub-structure is to be entered. This may be a tedious, time consuming process, subject to relatively high error.

Many ideographic characters include recognizable sub-structures, which are commonly used as components in various ideographic characters. Such sub-structures are known as radicals. About 700 radicals are recognized to exist in Chinese, probably less than 100 of which could be considered as being in relatively common use.

In some conventional coding systems (such as disclosed in U.S. Pat. No. 4,379,288), each time a radical must be entered, it must be analyzed into its basic components, even though the radical may appear frequently in the text being entered. The repeated entry of radicals according to basic components may represent a significant amount of operator time and effort and a source of input error.

Other conventional coding systems make use of radicals for coding purposes (see, for example, U.S. Pat. No. 4,327,421). However, such systems generally require specially designed and constructed keyboards to accomodate a relatively large number of radicals. Notwithstanding the use of radicals, each time an ideographic character or phrase must be entered, it must still be analyzed into its radical or other stroke or sub-structure components, even though the ideographic character or phrase may appear frequently in the text being entered. Accordingly, the repeated entry of characters or phrases according to their structural components may represent a significant amount of operator time and effort and a source of input error.

U.S. Pat. No. 4,379,288 teaches the use of special entry keys representing various high frequency combinations of code components. However, such a system may be difficult and inconvenient to use because of reliance on code numbers and combinations thereof. Such combinations are somewhat theoretical and a particular code combination may not correspond visually to any character, radical or other sub-structure. Such a system would require an operator highly trained in the use of codes. For the same reasons, the reliance on codes may result in a greater possibility of operator error.

In order to apply the various conventional coding techniques, various keyboard apparatuses have been proposed. In addition to the disadvantages described above with the conventional coding systems themselves, the conventional ideographic keyboards suffer from further disadvantages.

For example, U.S. Pat. No. 4,327,421 teaches an encoding method using standard Chinese character radicals, as well as a set of basic stroke components and some other sub-structure components. An oversized keyboard in order to accommodate the substantial number of sub-structures required is disclosed. Each key on the keyboard can define one of two sub-structures. A selection is made by pressing or not pressing the "shift" key. Systems of this sort require specially designed expensive keyboards. Such a specially designed keyboard may be unfamiliar to operators, thus resulting in slower learning. If the keyboard is physically large, it may be necessary for the operator's hands to move substantial distances, thus slowing data entry and increasing fatigue and the possibility of error.

In addition, such keyboards may physically be inefficiently laid out. The sub-structures included on the keyboard may be selected somewhat arbitrarily, resulting in inefficient data entry. Hence, speed and accuracy may be impaired. Finally, reliance on a shift key may substantially reduce the speed at which characters can be entered. Because one hand must be used to operate the shift key, numerous changes from "lower case" characters to "upper case" characters will reduce typing speed. The result of such factors is that the number of keystrokes required to enter typical ideographic text may be relatively high. In certain instances, the operator may be forced to use one hand, thus further reducing speed and increasing fatigue.

It should be understood that traditional Chinese ideographic characters do not have a lower case form and an upper case form. In relation to ideographic characters, in this specification, the term "lower case character" refers to a character on a conventional keyboard that is typed or input without also pressing the shift key. Similarly, an "upper case character" is a character on a conventional keyboard that is conventionally typed or input by simultaneously pressing the "shift key" or by typing a special mode selection key (such as a "shift lock" or "caps lock" key).

In order to avoid confusion, use of the terms "lower case" and "upper case" are avoided as much as possible in this specification. Instead, the different characters associated with a single key are each referred to as being on a different "level" of the keyboard. For instance, in a conventional English language typewriter, all lower case characters would be on a first level of the keyboard and all upper case letters on a second level. Characters in the conventional keyboard are selected from one level or the other by pressing or not pressing the shift key simultaneously with the individual character key.

U.S. Pat. No. 4,379,288 discloses the use of a conventional keyboard arrangement having 3 or 4 rows of keys, as might be used in a conventional Qwerty keyboard, having the 26 letters of the Latin alphabet, together with numeral, punctuation and special function keys. Various code combinations are associated with various keys for two-handed operation. The monographic code keys are located on opposite sides of the keyboard. Such an arrangement may present difficulties or be inconvenient to a novice operator, who may wish to type with only one hand, while following along in the Chinese text with the other. Finally, the conventional keyboard would require a shift key for changing from one level of the keyboard to another. Thus, the difficulties discussed above in relation to shift keys, resulting in slower operation, continue to exist.

The keyboards of U.S. Pat. Nos. 4,379,288 and 4,462,703 suffer from the further disadvantage that the Latin alphabet may not be included on the keyboard. Accordingly, with such keyboards it would be impossible to switch from the encoding of ideographic characters to the transliteration thereof into the Latin alphabet or even to the typing of another language, such as English.

STATEMENT OF THE INVENTION

The invention comprises a keyboard for entering ideographic characters of an ideographic written language into a system, each ideographic character being formed by certain basic written strokes and/or certain written sub-structures themselves composed of said strokes, the keyboard comprising entry keys thereon, each key operable to produce a unique signal according to the actuation thereof, and each key associated in a first form, with either:

a. one of a plurality of stroke identification indicia; or, b. a sub-structure frequently used in such language; and, in a second form, with a complete ideographic character frequently used in such language, said strokes being divided into a plurality of distinct groups with each group assigned one of said stroke identification indicia whereby a given stroke is represented by the assigned stroke identification index, said stroke identification indicia cooperating to allow any ideographic character to be represented by a series of stroke identification indicia, a first selection key operable to produce a unique signal to identify a series of entry key actuations as being in such first form representing a complete ideographic character, and, a second selection key operable to produce a unique signal to identify an entry key actuation as being in such second form representing a complete ideographic character.

The keyboard, input apparatus and method of the invention allow for the relatively rapid encoding of ideographic characters. The number of strokes required to encode conventional ideographic text, such as Chinese text, is reduced. Use of radical and character keys dedicated to selected high frequency use radicals and characters reduces the required number of keystrokes, thus allowing for improved speed and accuracy.

The various features of novelty which characterize the invention are pointed out with particularity in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF A SPECIFIC EMBODIMENT

Figure 1:
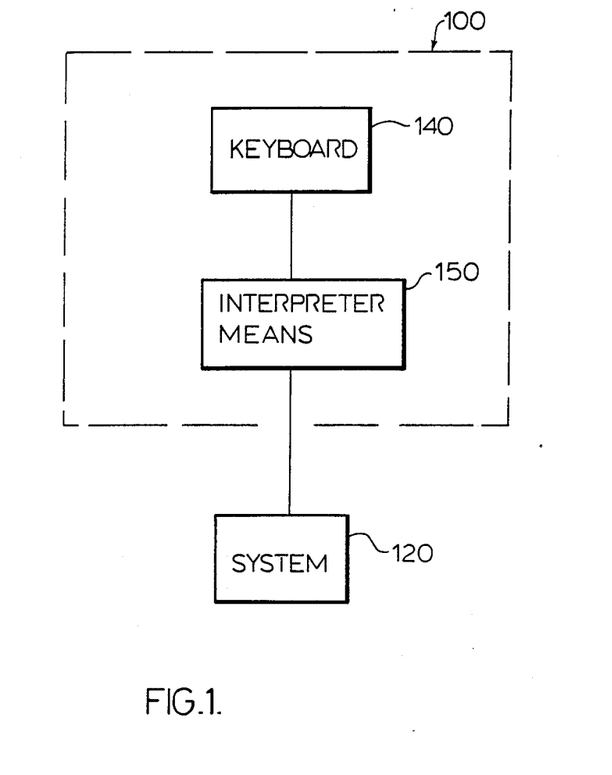
FIG. 1 is a block diagram, illustrating a keyboard according to the invention, as may be used in association with a system.

Referring to FIG. 1, there is shown an input means 100, according to the invention, connected to system 120. The output of input means 100 is connected to system 120, which may advantageously be a telecommunications system, an electronic data processing system, an electronic typewriter output or the like. System 120 may also be an electro-mechanical apparatus or an electronic output device.

Input means 100 comprises a keyboard 140, according to the invention, connected to interpreter means 150. The output of interpreter means 150 is adapted to connect to system 120.

Figure 2:
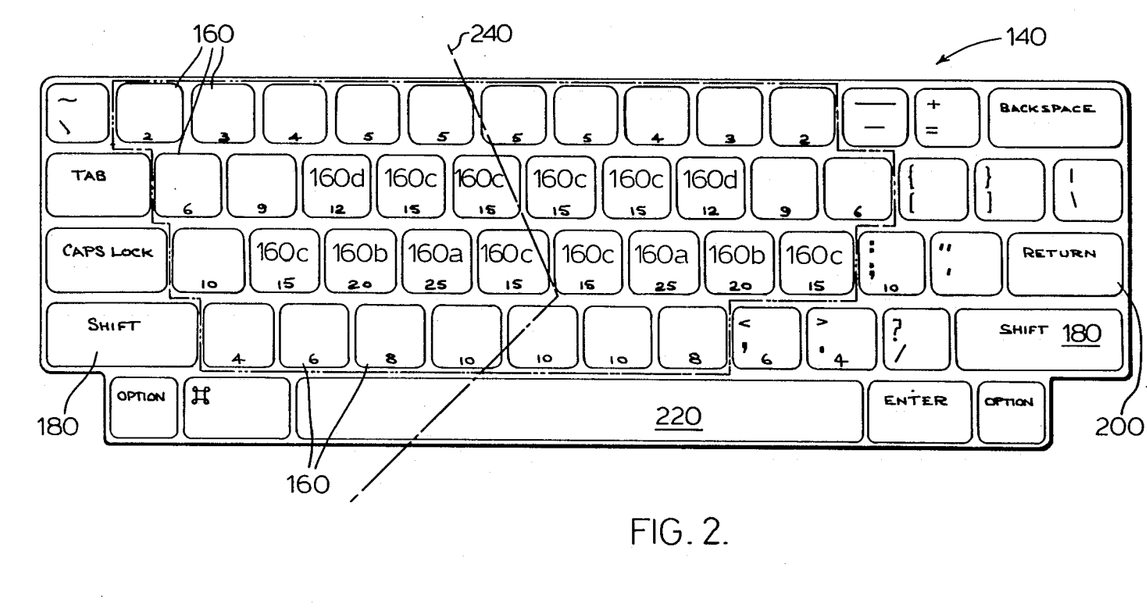
FIG. 2 is a schematic drawing of an unlabelled keyboard according to the invention.

Referring to FIG. 2, keyboard 140 comprises a conventional Latin alphabet keyboard (such as of the Qwerty-type) with entry keys 160. In particular, keyboard 140 preferably has four rows of at least about ten keys 160 each, available for the entry of various symbols. Keyboard 140 also has shift keys 180 for changing from one level of the keyboard to another, so that a keystroke is understood to be in one form or another depending on whether shift key 180 is actuated or not actuated. Keyboard 140 also includes a conventional carriage return key 200 and space bar 220. Some keys 160 may be reserved for special functions, carriage control, punctuation and the like. It is to be clearly understood that the keys 160 of keyboard 140, according to the invention, are assigned different functions (described below) than would be assigned in a conventional Latin alphabet keyboard.

Keyboard 140 is operable by a user for the purpose of entering data into system 120. Keyboard 140, as is well understood in the art, is operable to deliver a unique code signal (generally standardized and known as ASCII code), according to which key is depressed. Accordingly, the output from keyboard 140 comprises a train of code signals according to the sequence in which the various keys are depressed.

Keyboard 140 may be notionally divided into left and right hand halves by the line 240.

For touch typing on keyboard 140, it is well understood that there is only one ergonomically preferred "home" key for touch typing on each of the left and right hand sides, namely keys 160a. Similarly, the next preferred keys for rapid touch typing, in order of preference, are keys 160b, 160c and 160d. The numerals from 2 to 25 shown on keys 160 represent the ergonomic preferences from lowest to highest of the keys 160 relative to each other. It is to be noted that some of the keys 160 have the same ergonomic preference. For example, there are eight keys 160c having the same ergonomic preference value of 15. There appears to be no structural reason for preferring one such key 160c over another in the assignment of key symbols.

Interpreter means 150 is operable to receive the train of code signals from keyboard 140 and to interpret them in a pre-determined manner, as is described below.

Figure 3:
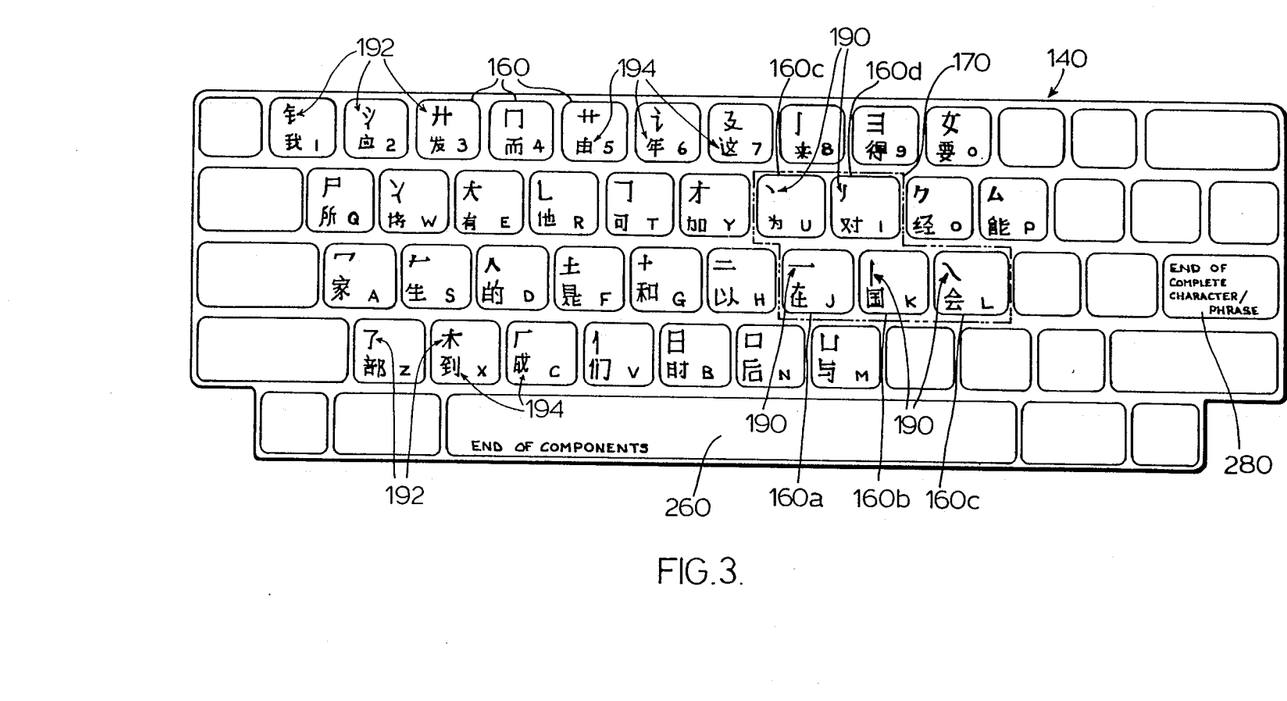
FIG. 3 is a schematic drawing of a labelled keyboard according to one embodiment of the invention; and, FIG. 4 is a block diagram of an interpreter means.

Referring to FIG. 3, there is shown a keyboard 140, according to the invention, showing the labelling of the various keys 160.

It has been found that, for the purposes of encoding Chinese ideographs, a set of five basic stroke components, or stroke identification indicia, may be adequately used. In particular, it has been found that the five basic stroke components may conveniently be a dot (or short) stroke, a horizontal (or left-to-right) stroke, a vertical (or downward) stroke, a left oblique (or lower-left-to/from-upper-right) stroke a right oblique (or upper-left-to/from-lower-right) stroke.

The embodiment of the invention described herein uses a five basic stroke encoding method merely as an illustration of the inventive principles. It will be appreciated that other encoding methods may be used. Accordingly, although keyboard 140 is illustrated having one particular selection of Chinese symbols, other selections may also be devised, depending on the encoding method used and language to be entered. It is not intended that the scope of the invention be restricted to the particular encoding method or language used herein as examples, but rather it is intended that the scope of the invention include any input method or apparatus constructed or operating according to the principles of the invention. Furthermore, even though one particular arrangement of symbols for a particular keyboard 140 is illustrated for use with the particular five basic stroke encoding method, other arrangements in accordance with the invention may also be devised. It is not intended that the scope of the invention be restricted to the particular arrangement of symbols or keyboard disclosed, but rather it is intended that the scope of the invention include any keyboard arranged according to the principles of the invention.

Each of the five basic stroke elements, or stroke identification indicia, is associated with one of keys 160 on a first level or form of keyboard 140. It has been found that the most frequently used basic stroke element in encoding Chinese text is the horizontal stroke, and that the others in order of decreasing frequency of use are the vertical stroke, the dot stroke, the left oblique stroke and the right oblique stroke. Such components are assigned to a block 170 of high preference keys on one side of keyboard 140, preferably the right hand side. Preferably, block 170 includes a highest preference key 160a. In particular, such basic stroke elements are respectively assigned the keys 160a, 160b, 160c (lower row), 160c (upper row) and 160d in order of decreasing frequency of use. Such an arrangement allows the operator to enter a code string for an ideographic character, conveniently using one hand. The fingers of one hand are not required to move significant distances in order to input character codes using the basic stroke components. In particular, the fingers of the operating hand are not required to move from one side of the keyboard to the other, as may be the case in keyboards designed for two-handed operation. Such an arrangement allows an operator to touch type, entering character codes, with one hand while following along in the Chinese text with the other. In addition, it has been found in typical Chinese typing situations using the keyboard 140, that basic stroke components are only infrequently consecutively typed. Accordingly, locating the five basic components adjacent to each other may also improve two-handed operation, by allowing for the alternate typing of basic stroke and other keys.

Preferably, depictions 190 are shown on, or otherwise associated with, keys 160a to 160d to represent the basic stroke components.

The most frequently used radicals (i.e. most frequently used in encoding typical Chinese text) are assigned the remaining key positions on the first level or form of keyboard 140 in order of two-handed key preference according to the frequency of use of such radicals. Preferably, depictions 192 are shown on, or otherwise associated with, keys 160 to represent such radicals.

On a second level or form of keyboard 140, each key 160 is also preferably associated with frequently used and relatively complicated complete ideographic characters. Some frequently used, but relatively simple, ideographic characters may only require a few radical and basic component keystrokes to enter, and such simple characters may be omitted from keyboard 140. The frequently used characters are assigned key positions in order of two-handed key preference according to the frequency of use of such characters. Preferably, depictions 194 are shown on, or otherwise associated with, keys 160 to represent the complete characters.

On a third level or form of keyboard 140, combinations of keys 160 may also be preferably associated with commonly used ideographic phrases, that is sequences of ideographic characters. As described below, such phrases may be pre-selected or pre-programmed by the operator and may change from time to time according to the operator's requirements. Accordingly, preferably there is no depiction of such phrases associated with the keys 160, although in certain cases such depictions may be desirable.

Finally, on a fourth level or form of keyboard 140, each key 160 is preferably also associated with the conventional Latin alphabet symbols, such as letters, numerals, punctuation marks and the like.

Depictions 190, 192 and 194 and other symbols may be directly indicated on or near keys 160. Alternatively, a keyboard overlay, as is well known in the art, may be used to associate the selected symbols with their particular keys 160.

In summary, keyboard 140 may be considered as defining several different levels or form. A first level may be defined by the basic stroke components and radicals. A second level may be defined by the complete ideographic characters. A third level may be defined by ideographic phrases. A fourth level may be defined by the Latin alphabet symbols.

Spacebar 220 (FIG. 2) is associated with a special stroke/radical selection, or "end-of-components" (herein referred to as "EOC"), or first selection key code and is defined to be an EOC key 260 (FIG. 3). As explained further below, EOC key 260 will be actuated by an operator after a sequence of keys 160 representing strokes and/or radicals has been typed. Actuation of EOC key 260 indicates that the previously typed keys were from the first level or form and thus represent a combination of strokes and/or radicals.

Similarly, return key 200 (FIG. 2) is associated with a special character/phrase selection, or "end-of-complete-character/phrase" (herein referred to as "EOCC/P"), code and is defined to be an EOCC/P key 280, or second selection key. As explained further below, EOCC/P key 280 will be actuated by an operator after only one key 160 representing a complete character has been previously typed. Actuation of EOCC/P key 280 indicates in such a case that the single previously typed key were from the second level or form and thus represents a complete character. EOCC/P key 280 will also be actuated after a sequence of keys 160 representing a phrase has been typed. In such a case, actuation of EOCC/P key 280 indicates that the previously typed keys were from a third level or form and thus represent a phrase.

Interpreter means 150 is operable to identify which keys 160 of keyboard 140 have been typed and to construct a complete character code in response to the typing of such keys. In particular, interpreter means 150 is operable to recognize that a particular key 160 has been typed and to make available for output (in a form that system 120 will recognize) the corresponding portion of the character code of the ideographic character being entered.

For example, if the horizontal basic stroke component key 160a is typed, interpreter means 150 is operable to recognize same and to substitute a code (such as, for example, the numeral 1) in a code string to be outputted to system 120.

On other hand, if a radical key 160 is typed, interpreter means 150 is operable to recognize same and to substitute therefor in the code string an appropriate code, which may be a combination of basic stroke component codes, for example the numerals 324.

If the EOC key 260 is typed, interpreter means 150 will recognize same. It will also recognize that the previous code string has been completed and represents a complete ideographic character and that the next keyboard entry will represent the beginning of a new incoming ideographic character. If the EOCC/P key 280 is typed, interpreter means 150 is operable to recognize same and to substitute the character code for the complete ideographic character associated with the key 160 previously typed, if only one key 160 has been so previously typed. Interpreter means 150 may also be operable to recognize the EOCC/P word/phrase key 280 as representing the end of a phrase identified by the two or more previous keys typed. In such a case, interpreter means 150 is operable to substitute the correct coding for the entire phrase, as may be predetermined and pre-entered by the user.

Figure 4:
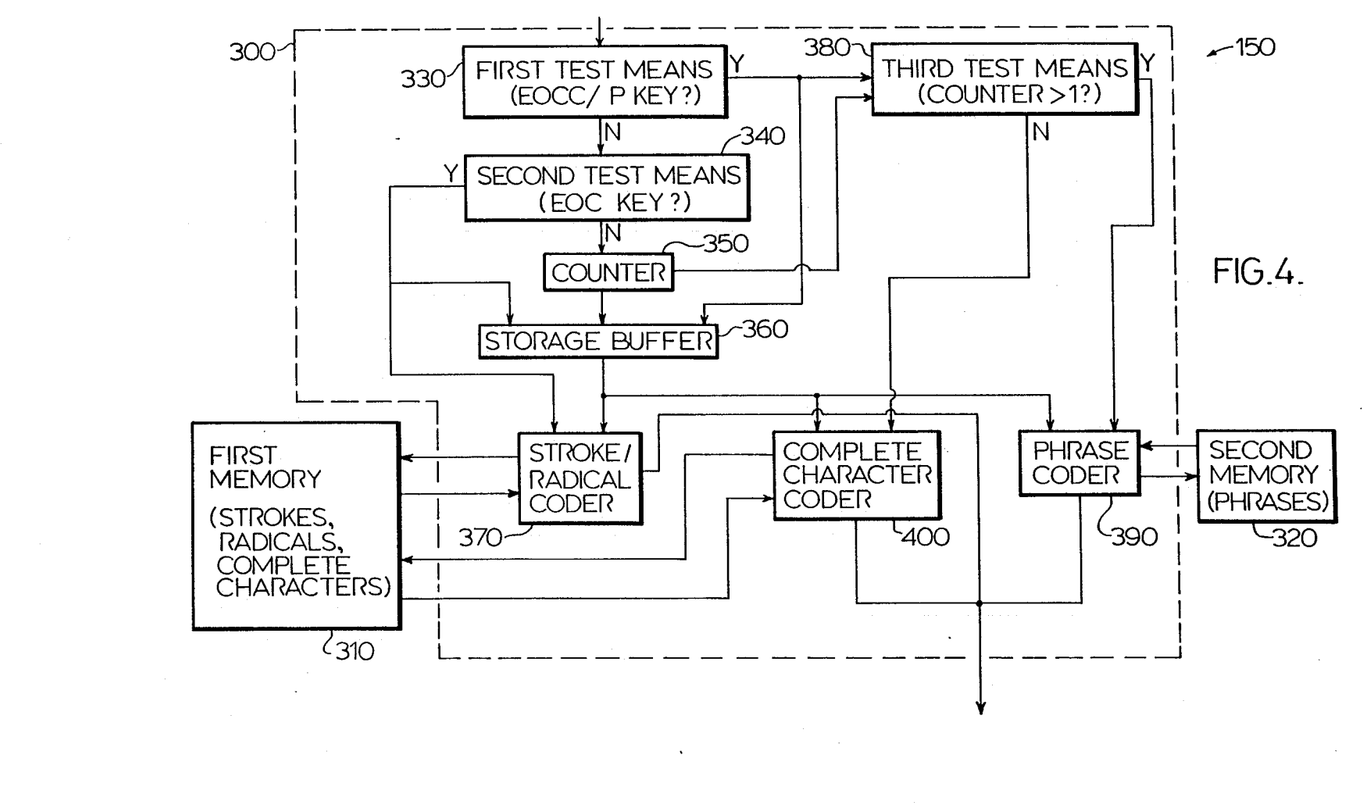

Referring to FIG. 4, there is shown an example of an interpreter means 150 which may be used in association with the keyboard 140 according to the invention.

It is not intended to restrict the scope of the particular interpreter means disclosed. It is intended that the scope of the invention include any interpreter means constructed or operating according to the principles of the invention. Interpreter means 150 comprises an interface means 300, adapted to receive keyboard signals. Connected to interface means 300 is a first memory means 310. Preferably, memory means 310 is pre-programmed to store code signal information regarding the individual basic stroke components and the high frequency use radicals and complete ideographic characters, on keyboard 140. A second memory means 320 is shown connected to interface means 300. Preferably, memory means 320 is programmable by the operator to store code signal information regarding high frequency use phrases.

Interface means 300 comprises a series of test means for ascertaining whether the EOCC/P or EOC keys 280 or 260 have been typed and, if so, providing the appropriate output. In particular, interface means 300 comprises a first test means 330 for ascertaining whether the EOCC/P key 280 has been pressed. Each keystroke received from keyboard 140 is tested. If the answer to the test is negative, the keyboard signal is passed to second test means 340. Second test means 340 is operable to determine whether the EOC key 260 has been depressed. If not, then the key which has been struck must be either a stroke component or a radical key. The number of such keystrokes is counted in counter 350 and the keystroke signal then transferred to storage buffer 360. Storage buffer 360 is operable to temporarily store the various keystroke signals consecutively entered into it.

If the answer to the test in second test means 340 is positive, this is an indication that all previous keystrokes, stored in buffer 360, now represents a completed ideographic character. Accordingly, second test means 340 is connected to transfer the keystroke signal to buffer 360 and also connected to stroke/radical coder 370 to enable same.

If the answer to the test in first test means 330 is positive, a third test is made in third test means 380 to determine whether the EOCC/P keystroke represents the completion of a complete ideographic character or of a phrase. If two or more strokes have been previously counted by counter 350, this is an indication that the EOCC/P keystroke represents a phrase. If only one previous keystroke has been counted by counter 350, this is an indication that the EOCC/P keystroke indicates the entry of a complete ideographic character. Accordingly, third test means 380 is connected to receive a count signal from counter 350. Specifically, third test means 380 may test whether the count from counter 350 is greater than 1. If the answer to the test in third test means 380 is positive, third test means 380 is connected to phrase coder 390 to enable same. If the answer is negative, third test means 380 is connected to complete character coder 400 to enable same. If the answer to the test in first test means 330 is positive, first test means 330 is connected to transfer the keystroke signal to storage buffer 360.

If any of coders 370, 390 or 400 are enabled, buffer 360 is operable to deliver its contents to the enabled coder 370, 390 or 400, as the case may be.

Stroke/radical coder 370 is connected to first memory means 310. If enabled, coder 370 is operable to receive the contents of buffer 360 and by using the information stored in first memory means 310 to convert the keystroke contents of buffer 360 into a character code suitable for delivery to system 120.

Similarly, complete character coder 400 is also connected to first memory means 310. By using the information contained in first memory means 310, complete character coder 400 is operable to receive the contents of buffer 360 and convert same into a character code.

Similarly, phrase coder 390 is connected to second memory means 320. Phrase coder 390 is operable to receive the contents of buffer 360 and to convert same into an appropriate phrase code for delivery to system 120.

In operation, the user will type a series of keys 160 on keyboard 140. Interpreter means 150 receives the string of keyboard codes. Interpreter means 150 sequentially substitutes therefor the proper code strings for the symbols depicted on the keys. If interpreter means 150 recognizes that the EOC key 220 has been typed, it converts the previously typed keystrokes into a code string, which may then be outputted to system 120. If interpreter means 150 recognizes that the EOCC/P key 240 has been typed and that only one previous key has been typed, interpreter means 150 will substitute the complete character code string of the ideographic character associated with such previous key. If interpreter means 150 recognizes that EOCC/P key 240 has been typed and that two or more keys have been typed previously, interpreter means 150 will substitute the complete code string for the entire ideographic character phrase, according to a set of pre-determined phrases. The completed character code string of the ideographic character or phrase is subsequently available to be outputted to system 120.

In a simpler embodiment, keyboard 140 may not be associated with any ideographic phrases. Accordingly, in such an embodiment, third test means 380, counter 350, phrase coder 390 and second memory means 320 could be omitted. In such a case, first test means 330 would be connected directly to completed character coder means 400 to enable same in the event of a positive test result.

The foregoing is a description of preferred embodiments of the invention, which is given herein by way of example only. The invention is not to be taken as limited to any of the specific features described, but comprehends all such variations thereof as come within the scope of the appended claims.

What is claimed is:

1. An input apparatus for entering ideographic characters of an ideographic written language into a system, each ideographic character being formed by certain basic written strokes and/or certain written radicals themselves composed of said strokes, said apparatus comprising:

keyboard means having a plurality of entry keys thereon, for representing stroke identification indicia, radicals and complete ideographic characters each said key being operable to produce a unique signal according to the actuation thereof, in a first form, said signal representing one of the group of:

a. one of a plurality of stroke identification indicia; and, b. one of a plurality of radicals frequently used in said language;

and, in a second form, said signal representing a complete ideographic character frequently used in said language; said strokes being divided into a plurality of distinct groups with each group assigned one of said stroke identification indicia whereby a given stroke is represented by the assigned stroke identification index, said stroke identification indicia being present in sufficient number and variety to allow any ideographic character to be represented by a series of stroke identification indicia;

said keyboard means also having a first selection key operable to produce a unique signal to identify a series of entry key actuations as being in said first form representing a complete ideographic character, and a second selection key operable to produce a unique signal to identify an entry key actuation as being in said second form representing a complete ideographic character; and, interpreter means connected to receive said signals from said keyboard means, said interpreter means being responsive to sequential actuation of said entry keys and said first and second selection keys to generate code signals representing said ideographic characters to be entered.

2. An input apparatus as claimed in claim 1 wherein said strokes are divided into at least five distinct groups.

3. An input apparatus as claimed in claim 2 wherein said interpreter means is responsive to sequential actuation of said entry keys and actuation of said first selection key to generate code signals corresponding to the stroke identification indicia and radicals of each of said actuated entry keys.

4. An input apparatus as claimed in claim 3 wherein said interpreter means is responsive to actuation of one of said entry keys and actuation of said second selection key to generate a code signal corresponding to the complete ideographic character associated with said one entry key.

5. An input apparatus as claimed in claim 4 wherein said keyboard means has a shift key and each said entry key is also associated with a conventional Latin alphabet keyboard symbol and said interface means is responsive to the actuation of a said entry key and said shift key to generate a code signal corresponding to said Latin alphabet keyboard symbol.

6. An input apparatus as claimed in claim 4 wherein said interpreter means comprises:
  interface means for controlling the generation of said code signal in response to signals from the keyboard means; and,
  first memory means connected to said interface means for storing code signal information regarding said stroke identification indicia and said selected frequently used radicals and complete ideographic characters.

7. An input apparatus as claimed in claim 6 wherein the actuation of said first or said second selection keys is subsequent to actuation of said entry key or keys.

8. An input apparatus as claimed in claim 7 wherein said interface means comprises:
  first test means for determining whether said second selection key has been acutated;
  second test means connected to said first test means for determining whether said first selection key has been actuated;
  a storage buffer connected to said second test means for temporarily storing keystroke signals originating from said keyboard means;
  stroke/radical coder means connected to said buffer and to said first memory means for receiving said keystroke signals from said buffer and converting same to said code signal;
  complete character coder means connected to said buffer and to said first memory means for receiving said keystroke signals from said buffer and converting same to said code signal;
  said first test means connected to and operable to enable said complete character coder means; and,
  said second test means connected to and operable to enable said stroke/radical coder means.

9. An input apparatus as claimed in claim 3 wherein pre-determined combinations of said entry keys are each associated with a pre-determined ideographic character phrase and said second selection key is operable to indicate that actuation of said entry keys represents either a complete ideographic character or an ideographic character phrase.

10. An input apparatus as claimed in claim 9 wherein said keyboard means has a shift key and each entry key is also associated with a conventional Latin alphabet keyboard symbol and said interface means is responsive to the actuation of said entry key and said shift key to generate a code signal corresponding to said Latin alphabet keyboard symbol.

11. An input apparatus as claimed in claim 9 wherein said interpreter means is responsive to actuation of a said combination of said entry keys and actuation of said second selection key to generate a code signal corresponding to the ideographic character phrase associated with said combination and to actuation of one of said entry keys and actuation of said second selection key to generate a code signal corresponding to the complete ideographic character associated with said one entry key.

12. An input apparatus as claimed in claim 11 wherein said interpreter means is programmable to store code signals corresponding to said phrases associated with said combinations of keys.

13. An input apparatus as claimed in claim 11 wherein said interpreter means comprises:
  interface means responsive to incoming signals from the keyboard means for controlling the generation of said code signals;
  first memory means connected to said interface means for storing code signal information regarding said stroke identification indicia and said selected frequently used radicals and complete ideographic characters; and,
  second memory means connected to said interface means for storing code signal information regarding said phrases.

14. An input apparatus as claimed in claim 13 wherein the actuation of said first or said second selection keys is subsequent to actuation of said entry key or keys.

15. An input apparatus as claimed in claim 14 wherein said interface means comprises:
  first test means for determining whether said second selection key has been actuated;
  second test means connected to said first test means for determining whether said first selection key has been actuated;
  a counter connected to said second test means for counting the number of keystrokes;
  a storage buffer connected to said counter for temporarily storing keystroke signals originating from said keyboard means;
  third test means connected to said first test means, operable when said second selection key has been actuated, and also connected to said counter for determining whether more than one keystroke has been counted;
  stroke/radical coder means connected to said buffer and to said first memory means for receiving said keystroke signals from said buffer and converting same to said code signal;
  complete character coder means connected to said buffer and to said first memory means for receiving said keystroke signals from said buffer and converting same to said code signal;
  phrase coder means connected to said buffer and to said second memory means for receiving said keystroke signals from said buffer and converting same to said code signal;
  said second test means connected to and operable to enable said stroke/radical coder means;
  said third test means connected to and operable to enable said complete character coder means when one keystroke has been counted; and said third test means connected to and operable to enable said phrase coder means when more than one keystroke has been counted.

16. An input apparatus as claimed in claim 3 wherein entry keys having stroke identification indicia associated therewith are located adjacent each other to define a block of entry keys.

17. An input apparatus as claimed in claim 16 wherein certain of said entry keys are ergonomically preferred relative to others for two-handed operation, said block of entry keys comprise the most preferred keys on one side of said keyboard, each of said stroke identification indicia being associated with a said entry key in said block according to the frequency of use during encoding of said stroke identification indicia, each said radical being associated with another entry key outside said block according to the frequency of use during encoding of said radical, and each said ideographic character being associated with one of said entry keys according to the frequency of use during encoding of said ideographic characters.

18. An input apparatus as claimed in claim 17 wherein said ideographic language is Chinese and said strokes are divided into five distinct groups.

19. An input apparatus as claimed in claim 18 wherein said entry keys are associated with stroke identification indicia, radicals and ideographic characters generally as shown below:

[keyboard layout diagram]

20. An input apparatus as claimed in claim 18 wherein radicals selected from the following group of radicals:

乚  乛  扌  宀  人  土  十  二 are associated with certain of said entry keys.

21. An input apparatus as claimed in claim 18 wherein ideographic characters selected from the following group of ideographic characters:

怖  司  加  ⺈  生  的

是  知  以  在  囗  全 are associated with certain of said entry keys.

22. An input apparatus as claimed in claim 18 wherein radicals selected from the following group of radicals:

乚  乛  扌  宀  人  土  十  二 are associated with certain of said entry keys, and ideographic characters selected from the following group of ideographic characters:

怖  司  加  ⺈  生  的

是  知  以  在  囗  全 are associated with certain of said entry keys.

23. A keyboard for entering ideographic characters of an ideographic written language into a system, each ideographic character being formed by certain basic written strokes and/or certain written radicals themselves composed of said strokes, said keyboard comprising:

entry keys thereon for representing stroke identification indicia, radicals and complete ideographic characters, each key operable to produce a unique signal according to the actuation thereof, and each key associated:

in a first form, with one of the group of:
a. one of a plurality of stroke identification indicia; and,
b. one of a plurality of radicals frequently used in said language;

and, in a second form, with a complete ideographic character frequently used in said language; said strokes being divided into a plurality of distinct groups with each group assigned one of said stroke identification indicia whereby a given stroke is represented by the assigned stroke identification index, said stroke identification indicia being present in sufficient number and variety to allow any ideographic character to be represented by a series of stroke identification indicia;

a first selection key operable to produce a unique signal to identify a series of entry key actuations as being in said first form representing a complete ideographic character; and, a second selection key operable to produce a unique signal to identify an entry key actuation as being in said second form representing a complete ideographic character.

24. A keyboard as claimed in claim 23 wherein said strokes are divided into at least five distinct groups.

25. A keyboard as claimed in claim 23 wherein said entry keys having stroke identification indicia associated therewith are located adjacent each other to define of block of entry keys.

26. A keyboard as claimed in claim 25 wherein certain of said entry keys are ergonomically preferred relative to others for two-handed operation, said block of entry keys comprise the most preferred keys on one side of said keyboard, each of said stroke identification indicia being associated with a said entry key in said block according to the frequency of use during encoding of said stroke identification indicia, each said radical being associated with another entry key outside said block according to the frequency of use during encoding of said radical, and each said ideographic character being associated with one of said entry keys according to the frequency of use during encoding of said ideographic characters.

27. A keyboard as claimed in claim 26 wherein said ideographic language is Chinese and said strokes are divided into five distinct groups.

28. A keyboard as claimed in claim 27 wherein radicals selected from the following group of radicals:

乚  乛  扌  宀  人  土  十  二 are associated with certain of said entry keys.

29. A keyboard as claimed in claim 27 wherein ideographic characters selected from the following group of ideographic characters:

怖  司  加  ⺈  生  的

是  知  以  在  囗  全 are associated with certain of said entry keys.

30. A keyboard as claimed in claim 27 wherein radicals selected from the following group of radicals:

乚  ㄱ  才  ⼂  ㅅ  土  十  = are associated with certain of said entry keys, and ideographic characters selected from the following group of ideographic characters:

也  可  如  ㄣ  生  的

是  知  以  在  回  會 are associated with certain of said entry keys.

31. A keyboard as claimed in claim 27 wherein said entry keys are associated with stroke identification indicia, radicals and ideographic characters generally as shown below:

32. A method for entering ideographic characters of an ideographic written language into a system using a keyboard having a plurality of entry keys thereon, for representing stroke identification indicia, radicals and complete ideographic characters each said key being operable to produce a unique signal according to the actuation thereof, each ideographic character being formed by certain basic written strokes and/or certain written radicals themselves composed of said strokes, said method comprising:
  associating said entry keys, in a first form, with one of the group of:
    a. one of a plurality of stroke identification indicia; and,
    b. one of a plurality of radical frequently used in said language;
  and, associating said entry keys, in a second form, with a complete ideographic character frequently used in said language;
  dividing said strokes into a plurality of distinct groups and assigning each group with one of said stroke identification indicia whereby a given stroke is represented by the assigned stroke identification index, said stroke identification indicia being present in sufficient number and variety to allow any ideographic character to be represented by a series of stroke identification indicia;
  associating a first selection key on said keyboard means with selection indicia to identify a series of entry key actuations as being in said first form representing a complete ideographic character,
  associating a second selection key on said keyboard means with selection indicia to identify an entry key actuation as being in said second form representing a complete ideographic character; and,
  interpreting signals from said keyboard means to generate, in response to sequential actuation of said entry keys and said first and second selection keys, code signals representing said ideographic characters to be entered.

33. A method as claimed in claim 32 wherein said strokes are divided into at least five distinct groups.

34. A keyboard as claimed in claim 24 further comprising a shift key and wherein each said entry key is also associated with a conventional Latin alphabet keyboard symbol.

35. A method as claimed in claim 33 wherein said interpreting occurs in response to sequential actuation of said entry keys and actuation of said first selection key to generate code signals corresponding to the stroke identification indicia and radicals of each of said actuated entry keys.

36. A method as claimed in claim 35 wherein said interpreting further occurs in response to actuation of one of said entry keys and actuation of said second selection key to generate a code signal corresponding to the complete ideographic character associated with said one of said entry keys.

37. A method as claimed in claim 36 wherein the actuation of said first or said second selection keys is subsequent to actuation of said entry key or keys.

38. A method as claimed in claim 37 wherein said interpreting step comprises the steps of:
  determining whether said second selection key has been actuated;
  determining whether said first selection key has been actuated;
  converting keystroke signals originating from said keyboard into a stroke or radical code signal in the event that said first selection key has been actuated; and,
  converting said keystroke signals from said keyboard into a character code signal in the event that said second selection key has been actuated.

39. A method as claimed in claim 38 comprising the further step of temporarily storing said keystroke signals in a storage buffer and said conversion steps convert said keystroke signals from said buffer.

40. A method as claimed in claim 36 wherein said keyboard has a shift key and the method comprises the further step of associating each said entry key also with a conventional Latin alphabet keyboard symbol.

41. A method as claimed in claim 35 comprising the further step of associating pre-determined ideographic character phrases with pre-determined combinations of said entry keys and wherein said second selection key is operable to indicate that actuation of said entry keys represents either a complete ideographic character or an ideographic character phrase.

42. A method as claimed in claim 41 wherein said keyboard has a shift key and the method comprises the further step of associating each said entry key also with a conventional Latin alphabet keyboard symbol.

43. A method as claimed in claim 41 wherein interpreting further occurs in response to actuation of a said combination of said entry keys and actuation of said second selection key to generate a code signal corresponding to the ideographic character phrase associated with said combination and to actuation of one of said entry keys and actuation of said second selection key to generate a code signal corresponding to the complete ideographic character associated with said one entry key.

44. A method as claimed in claim 43 comprising the further step of pre-programming a memory to store code signals corresponding to said phrases associated with said combinations of keys.

45. A method as claimed in claim 43 wherein the actuation of said first or said second selection keys is subsequent to actuation of said entry key or keys.

46. A method as claimed in claim 45 wherein said interpreting step comprises the steps:

determining whether said second selection key has been actuated;

determining whether said first selection key has been actuated;

counting the number of keystrokes originating from said keyboard;

determining whether more than one keystroke has been counted;

converting said keystroke signals and said buffer into a stroke or radical code signal in the event that said first selection key has been actuated;

converting said keystroke signals into a character code signal in the event that said second selection key has been actuated and only one keystroke has been counted; and converting said keystroke signals into a phrase code signal in the event that said second selection key has been actuated and more than one keystroke has been counted.

47. A method as claimed in claim 46 comprising the further step of temporarily storing said keystroke signals in a storage buffer and said conversion steps convert said keystroke signals from said storage buffer.

48. A method as claimed in claim 35 including the further step of locating said entry keys having stroke identification indicia associated therewith adjacent each other to define a block of entry keys.

49. A method as claimed in claim 48 wherein certain of said entry keys are ergonomically preferred relative to others for two-handed operation, said block of entry keys comprise the most preferred keys on one side of said keyboard, each of said stroke identification indicia being associated with a said entry key in said block according to the frequency of use during encoding of said stroke identification indicia, each said radical being associated with another entry key outside said block according to the frequency of use during encoding of said radical, and each said ideographic character being associated with one of said entry keys according to the frequency of use during encoding of said ideographic characters.

50. A method as claimed in claim 49 wherein said ideographic language is Chinese and said strokes are divided into five distinct groups.

51. A method as claimed in claim 50 wherein said stroke identification indicia, radicals and ideographic characters are associated with said entry keys generally as shown below:

52. A method as claimed in claim 27 wherein radicals selected from the following group of radicals:

L  ㄱ  才  ㅡ  人  土  十  = are associated with certain of said entry keys.

53. A method as claimed in claim 27 wherein ideographic characters selected from the following group of ideographic characters:

地  司  加  为  生  的

是  知  以  在  国  会 are associated with certain of said entry keys.

54. A method as claimed in claim 27 wherein radicals selected from the following group of radicals:

L  ㄱ  才  ㅡ  人  土  十  = are associated with certain of said entry keys, and ideographic characters selected from the following group of ideographic characters:

地  司  加  为  生  的

是  知  以  在  国  会 are associated with certain of said entry keys.

* * * * *